Oct. 11, 1927.

O. BROWN 1,645,412

AUTOMATIC KNOCK-OFF FOR COTTON PICKERS

Filed April 2, 1927

INVENTOR.

Oscar Brown,

BY

Geo. P. Kimmel ATTORNEY.

Oct. 11, 1927.
O. BROWN
1,645,412
AUTOMATIC KNOCK-OFF FOR COTTON PICKERS
Filed April 2, 1927  3 Sheets-Sheet 2
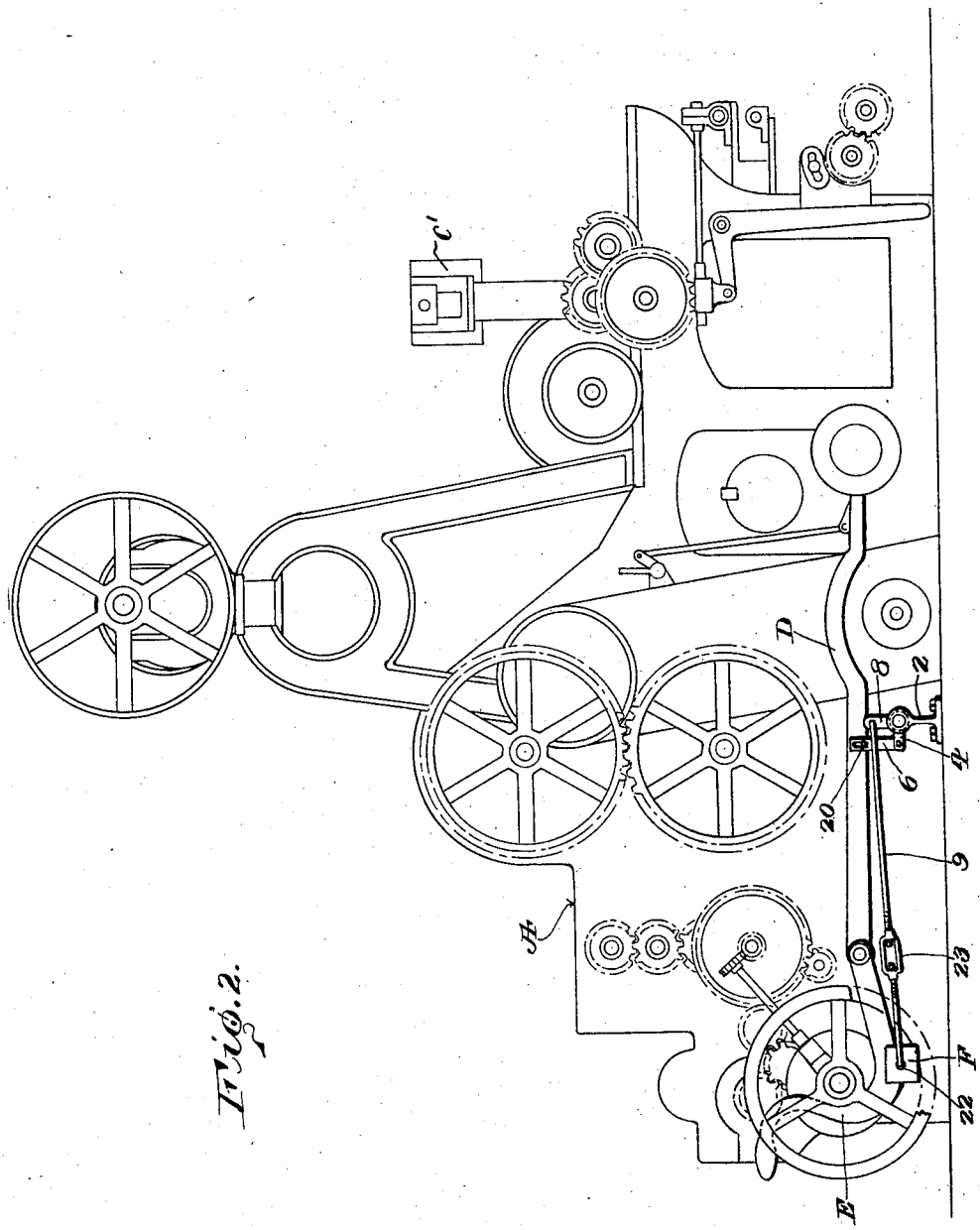
INVENTOR.
Oscar Brown,
BY
Geo. F. Kimmel, ATTORNEY.

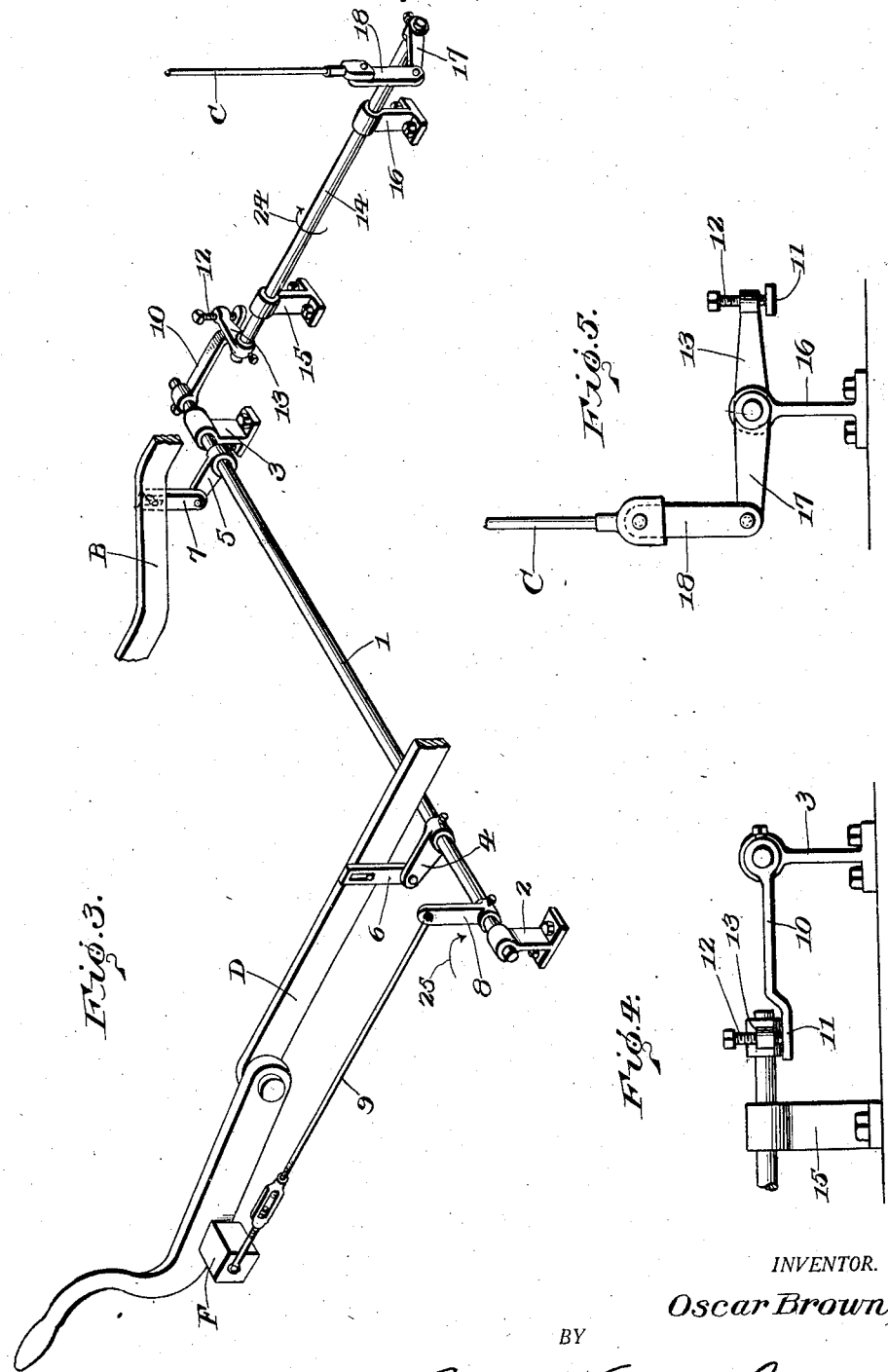

Patented Oct. 11, 1927.

1,645,412

UNITED STATES PATENT OFFICE.

OSCAR BROWN, OF COLUMBUS, GEORGIA, ASSIGNOR OF ONE-HALF TO MORTON MACHINE WORKS, OF COLUMBUS, GEORGIA, A CORPORATION.

AUTOMATIC KNOCK-OFF FOR COTTON PICKERS.

Application filed April 2, 1927. Serial No. 180,564.

This invention relates to a stop or knock off attachment for cotton picker machines and has for its object to automatically discontinue the operation of the machine in case of a cotton choke forming therein, under such conditions preventing damage to the machine, which otherwise would be the case if the machine continued to operate as the choke attempts to pass.

A further object of the invention is to provide a stop or knock off attachment for cotton picker machines for automatically discontinuing the operation thereof when a choke of cotton should attempt to pass the calender rolls or the evener box thereby preventing the breakage or damage of certain elements of the machine, such as the picker weight levers, fiddle back roller and gears, beaters, grid bars, evener and evener box.

A further object of the invention is to provide an attachment for cotton picker machines acting to immediately discontinue the operation of the machine in case of a choke of cotton therein.

Further objects of the invention are to provide, in a manner as hereinafter set forth an automatic stop or knock off attachment for cotton picker machines which is simple in its construction and arrangement, strong, durable, compact, thoroughly efficient in its use, automatic in its action, readily installed with respect to a cotton picker machine and comparatively inexpensive to set up.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a side elevation of a cotton picker machine, looking towards the left side thereof, showing the adaptation therewith of a stop or knock off attachment in accordance with this invention.

Figure 3 is a perspective view of a stop or knock off attachment in accordance with this invention and illustrating the same as attached to the right and left hand weight levers of the machine and also to the knock off lever.

Figure 4 is a fragmentary view in elevation illustrating the adjusting means for controlling the throw of the attachment.

Figure 5 is a fragmentary view in end elevation of the attachment.

Figure 1:
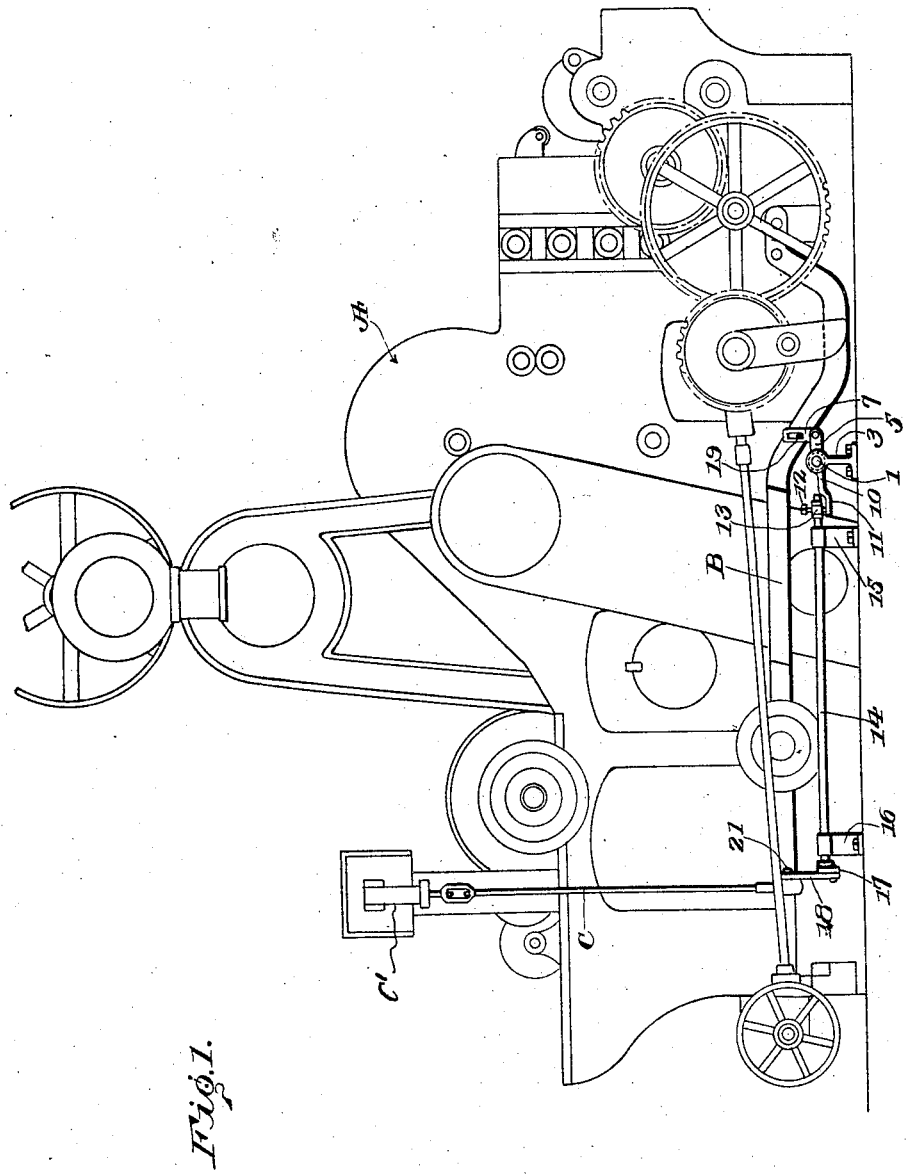
Figure 1 is a side elevation, looking towards the right side of a cotton picker machine and showing the adaptation therewith of an automatic stop or knock off attachment therefor.

Referring to the drawings in detail an automatic stop or knock off attachment for cotton picker machines in accordance with this invention includes an operating shaft 1, mounted in a pair of floor bearings 2, 3 and extended at one end an appropriate distance from the floor bearing 3. Secured to the shaft 1 is a pair of forwardly directed crank arms 4, 5 arranged in spaced relation and positioned on the shaft 1 between the floor bearings 2, 3. Pivotally connected to the crank arm 4 at its outer end is a vertically disposed slotted lifter 6 and pivotally connected to the outer end of the crank arm 5 is a vertically disposed lifter 7. Secured to the shaft 1 at a point between the crank arm 4 and the floor bearing 2 is a crank arm 8 which is disposed at right angles with respect to the crank arm 4. The crank arms 4, 5 extend forwardly at right angles with respect to the crank arm 8, when the said crank arms are in normal position. Pivotally connected to the outer end of the crank arm 8 is a forwardly directed, adjustable pull rod 9.

That end of the shaft 1 which projects from the floor bearing 3, has secured thereto, a rearwardly directed lever arm 10, having its rear end offset as at 11 to extend in a plane below the plane of the major portion of said arm 10 and said offset portion 11 provides a seat engaged by a set screw 12, which is adjustably connected to a crank arm 13, fixed to the forward end of an auxiliary shaft 14. The crank arm 13 is disposed at right angles with respect to the lever arm 10 and overlaps the offset portion 11 of said lever arm 10. The shaft 14 is disposed at right angles with respect to the shaft 1 and is mounted in floor bearings 15, 16 and the shaft 14 is of a length to project forwardly from the bearing 15 and rearwardly from the bearing 16, and the rear end of the shaft 14, has connected thereto a crank arm 17, carrying at its outer end an upstanding link 18 which is pivotally connected to said crank arm 17.

A cotton picker machine is generally indicated by the reference character A and it includes a right hand weight lever B, an evener rod C on the right side of the machine, a weight lever D on the left side of the machine which extends to the evener box C', a kick off lever E having a foot tread F. The kick off lever E is arranged on the left side of the machine. The foregoing elements are of known construction.

The shaft 1 is extended through the housing of the machine and is positioned approximately from three to five inches above the bottom of the side walls of the housing. The shaft 1 is arranged intermediate the ends of the housing and projects laterally a substantial distance from each side thereof. The crank arms 4, 5 are arranged below the right and left weight levers and the lifter 7 is slidably connected as at 19 to the weight lever B. The lifter 6 is slidably connected, as at 20 to the weight lever D. The link 18 is pivotally connected as at 21 to the evener rod C. The shaft 14 is arranged adjacent the right side of the machine. The pull rod 19 is arranged adjacent the left side of the machine and is pivotally connected as at 22 to the foot tread F of the kick off lever E. The pull rod 9 is formed of two sections adjustably connected together by a turn-buckle 23. The operating shaft 1 is not connected with the shaft 14, that is to say directly connected to the shaft 14, but has an operative connection therebetween through the medium of the lever 10, screw 12 and offset portion 11 of the crank arm 10.

The construction and arrangement of the parts of the attachment is such that when a choke of cotton attempts to pass the evener box C', it causes the evener rod C' to move upwardly, which in turn raises the crank arm 17, causing thereby a partial rotation of the auxiliary shaft 14, carrying the crank arm 13 therewith and the movement of the auxiliary shaft will cause the crank arm 13 to move downwardly, whereby the adjusting screw 12, engaging with the offset portion 11 of the lever arm 10 will provide for a partial rotation of the shaft 1. The auxiliary shaft 14 will move in the direction of the arrow 24, and the operating shaft 1 will move in the direction of the arrow 25. The movement of the shaft 1, in the direction of the arrow 25 will pull the rod 9 in a direction towards the shaft 1 and shift the knock-off lever E to the desired extent to discontinue the operation of the machine.

When a choke of cotton attempts to pass between the calendar rolls, it raises the weight levers up, which in turn carry the lifters 6, 7 therewith, causing the shaft 1 to revolve in the direction of the arrow 25 and pull the rod 9 in a direction towards the shaft 1, and shift the knock off lever E sufficiently to discontinue the operation of the machine.

It is thought the many advantages of an automatic stop or knock off attachment, in accordance with this invention for cotton picker machines can be readily understood, particularly in view of the fact that it provides for the discontinuing of the operation of the cotton picking machine when there is a choke of cotton therein, as the discontinuance of the operation will prevent damage to the elements of the machine, as would be the case if the machine was operating when choked, and although the preferred embodiment of the attachment is as illustrated and described, yet it is to be understood that changes in the details of construction can be had which will fall within the scope of the invention as claimed.

What I claim is:

1. A knock-off attachment for cotton picker machines of that type including kick-off and weight levers and an evener rod comprising a rock shaft, shifting means for connection with the kick-off lever of the machine and operated by said shaft to shift the kick-off lever to discontinue the operation of the machine, and means operated when the machine is choked for rocking said shaft to provide for the operation of said shifting means to shift the kick-off lever.

2. A knock-off attachment for cotton picker machines of that type including kick-off and weight levers and an evener rod comprising a rock shaft, means carried by said shaft for connection with the weight levers of the machine, an operative connection between said shaft and the evener rod of the machine, and an operative connection leading from said shaft to the kick-off lever of the machine.

3. A knock-off attachment for cotton picker machines of that type including weight and kick-off levers and an evener rod comprising a rock shaft actuated in one direction when the machine is choked, operative connections between the weight levers of the machine and said shaft, an operative connection between said shaft and the evener rod of the machine, and an operative connection between said shaft and the kick-off lever of the machine.

4. A knock-off attachment for cotton picker machines of that type including weight and kick-off levers and an evener rod comprising a rock shaft adapted to be disposed transversely of the housing of the machine, operative connections between the ends of the shaft and the weight levers of the machine, an operative connection between one end of the shaft and the evener rod of the machine, and an operative connection between the other end of the shaft and the kick-off lever of the machine.

5. A knock-off attachment for cotton picker machines of that type including weight and kick-off levers and an evener rod comprising a rock shaft actuated in one direction when the machine is choked, operative connections between the weight levers of the machine and said shaft, an operative connection between said shaft and the evener rod of the machine, an operative connection between said shaft and the kick-off lever of the machine, said operative connection between the shaft and said evener rod being adjustable.

6. A knock-off attachment for cotton picker machines of that type including weight and kick-off levers and an evener rod comprising a rock shaft adapted to be disposed transversely of the housing of the machine, operative connections between the ends of the shaft and the weight levers of the machine, an operative connection between one end of the shaft and the evener rod of the machine, an operative connection between the other end of the shaft and the kick-off lever of the machine, the operative connection between said shaft and said evener rod being adjustable.

7. A knock-off attachment for cotton picker machines of that type including kick-off and weight levers and an evener rod comprising a rock shaft, shifting means for connection with the kick-off lever of the machine and operated by said shaft to shift the kick-off lever to discontinue the operation of the machine, means operated when the machine is choked for rocking said shaft to provide for the operation of said shifting means to shift the kick-off lever, said shiftable means for said kick-off lever being adjustable.

8. A knock-off attachment for cotton picker machines of that type including weight and kick-off levers and an evener rod comprising a rock shaft actuated in one direction when the machine is choked, operative connections between the weight levers of the machine and said shaft, an operative connection between said shaft and the evener rod of the machine, an operative connection between said shaft and the kick-off lever of the machine, the operative connection between said shaft and kick-off lever being adjustable.

9. A knock-off attachment for cotton picker machines of that type including weight and kick-off levers and an evener rod comprising a rock shaft adapted to be disposed transversely of the housing of the machine, operative connections between the ends of the shaft and the weight levers of the machine, an operative connection between one end of the shaft and the evener rod of the machine, an operative connection between the other end of the shaft and the kick-off lever of the machine, the operative connection between said shaft and kick-off lever being adjustable.

In testimony whereof, I affix my signature hereto.

OSCAR BROWN.